United States Patent
Kloft et al.

(10) Patent No.: US 12,404,879 B2
(45) Date of Patent: Sep. 2, 2025

(54) SEPARATOR AND HYDRAULIC ACCUMULATOR HAVING SUCH A SEPARATOR

(71) Applicant: Hydac Technology GmbH, Sulzbach / Saar (DE)

(72) Inventors: Peter Kloft, Ransbach-Baumbach (DE); Torsten Kusserow, Thörnich (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 0 days.

(21) Appl. No.: 18/566,793

(22) PCT Filed: May 24, 2022

(86) PCT No.: PCT/EP2022/063977
§ 371 (c)(1),
(2) Date: Dec. 4, 2023

(87) PCT Pub. No.: WO2022/258359
PCT Pub. Date: Dec. 15, 2022

(65) Prior Publication Data
US 2024/0271639 A1    Aug. 15, 2024

(30) Foreign Application Priority Data
Jun. 10, 2021   (DE) .................... 10 2021 002 971.2

(51) Int. Cl.
| F15B 1/10 | (2006.01) |
| B33Y 80/00 | (2015.01) |
| F16J 3/04 | (2006.01) |

(52) U.S. Cl.
CPC .............. *F15B 1/103* (2013.01); *F16J 3/047* (2013.01); *B33Y 80/00* (2014.12); *F15B 2201/3153* (2013.01); *F15B 2201/61* (2013.01)

(58) Field of Classification Search
CPC .............. F15B 1/103; F15B 2201/3151; F15B 2201/3155; F15B 2201/61; F16J 3/047
See application file for complete search history.

(56) References Cited

U.S. PATENT DOCUMENTS

| 5,261,319 A  * | 11/1993 | Laville ..................... F16J 3/047 |
| | | 92/103 M |
| 7,399,372 B2 * | 7/2008 | Okada .................... F15B 1/103 |
| | | 148/592 |

(Continued)

FOREIGN PATENT DOCUMENTS

| DE | 102006014456 A1 | 10/2007 | ................ F15B 1/04 |
| DE | 10009865 B4 | 12/2007 | ................ F15B 1/02 |

(Continued)

OTHER PUBLICATIONS

Search Report for International Application No. PCT/EP2022/063677, 5 pages.
German Office Action, Application No. 102021002971.2, 5 pages.

*Primary Examiner* — Michael Leslie
(74) *Attorney, Agent, or Firm* — Slayden Grubert Beard PLLC

(57) ABSTRACT

Separator and hydraulic accumulator having such a separator. A separator, in particular for a hydraulic accumulator, such as a bellows accumulator, which is produced by a 3D printing process, consisting of one single diaphragm, which, when viewed in cross section, is deflected in an arcuate shape to form a multitude of bellows pleats at deflection points, which delimit the bellows pleats on the outside and the inside, and in that, to obtain an isotensoid or essentially isotensoid stress profile in the diaphragm, the notional extensions of the diaphragm surfaces adjacent to each deflection point form an acute angle with each other, at least in an initial state.

18 Claims, 6 Drawing Sheets

(56) References Cited

U.S. PATENT DOCUMENTS

| | | | |
|---|---|---|---|
| 9,683,583 B2 * | 6/2017 | Arikawa | F16J 3/047 |
| 10,378,649 B2 * | 8/2019 | Sato | F16J 3/04 |
| 10,520,084 B2 * | 12/2019 | Sato | F15B 1/103 |
| 10,830,352 B2 * | 11/2020 | Arikawa | F16J 15/52 |
| 10,900,537 B2 * | 1/2021 | Godfrey | B22F 3/24 |
| 11,092,288 B2 | 8/2021 | Kloft et al. | |

FOREIGN PATENT DOCUMENTS

| | | | |
|---|---|---|---|
| DE | 10 2015 206251 | 10/2016 | B22F 3/105 |
| DE | 102015017026 A1 | 7/2017 | B22F 3/10 |
| EP | 1 975 417 | 10/2008 | F15B 1/08 |
| EP | 2 682 207 | 1/2014 | B22F 3/105 |
| WO | 03 016722 | 2/2003 | F15B 1/08 |

* cited by examiner

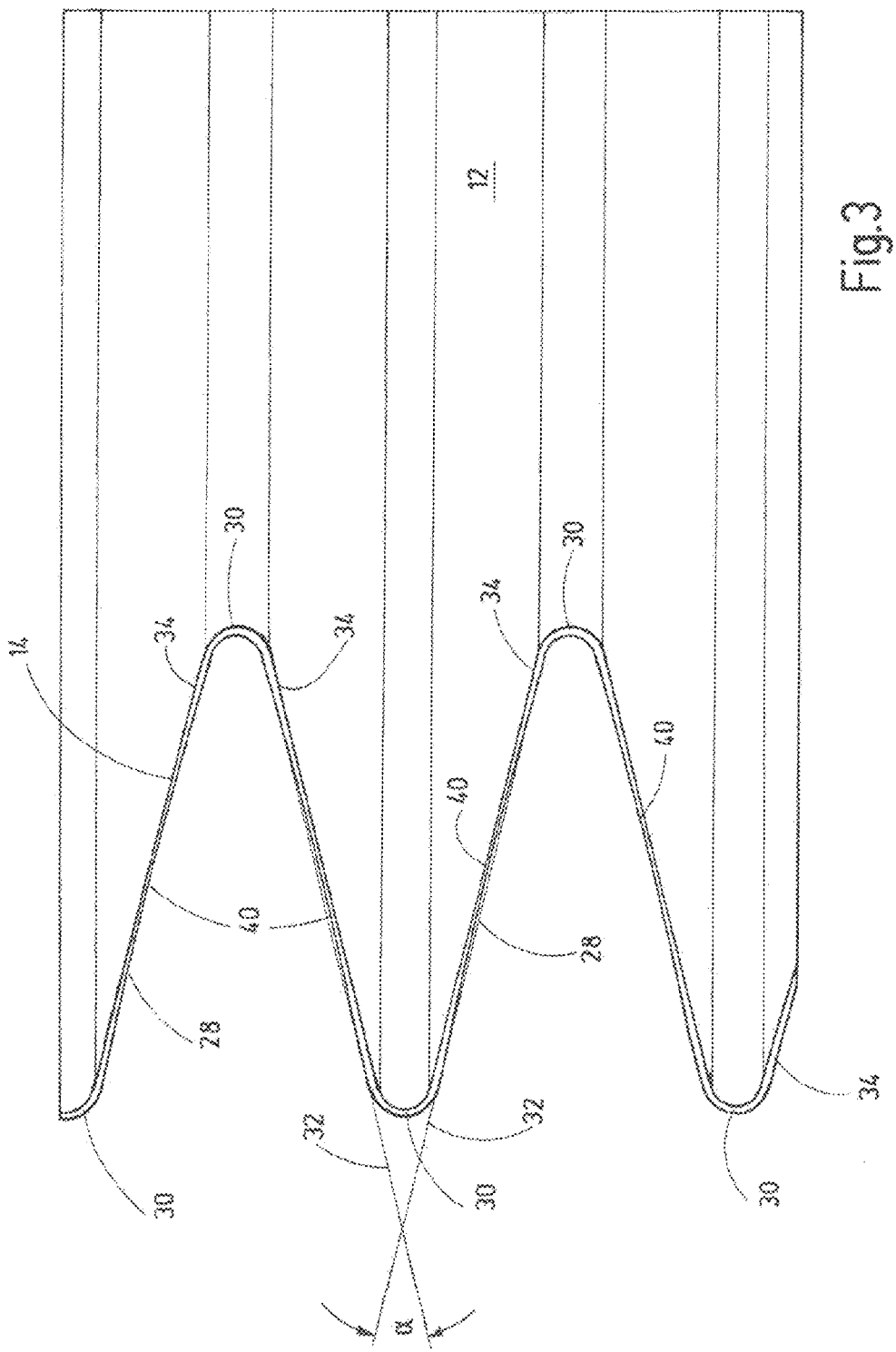

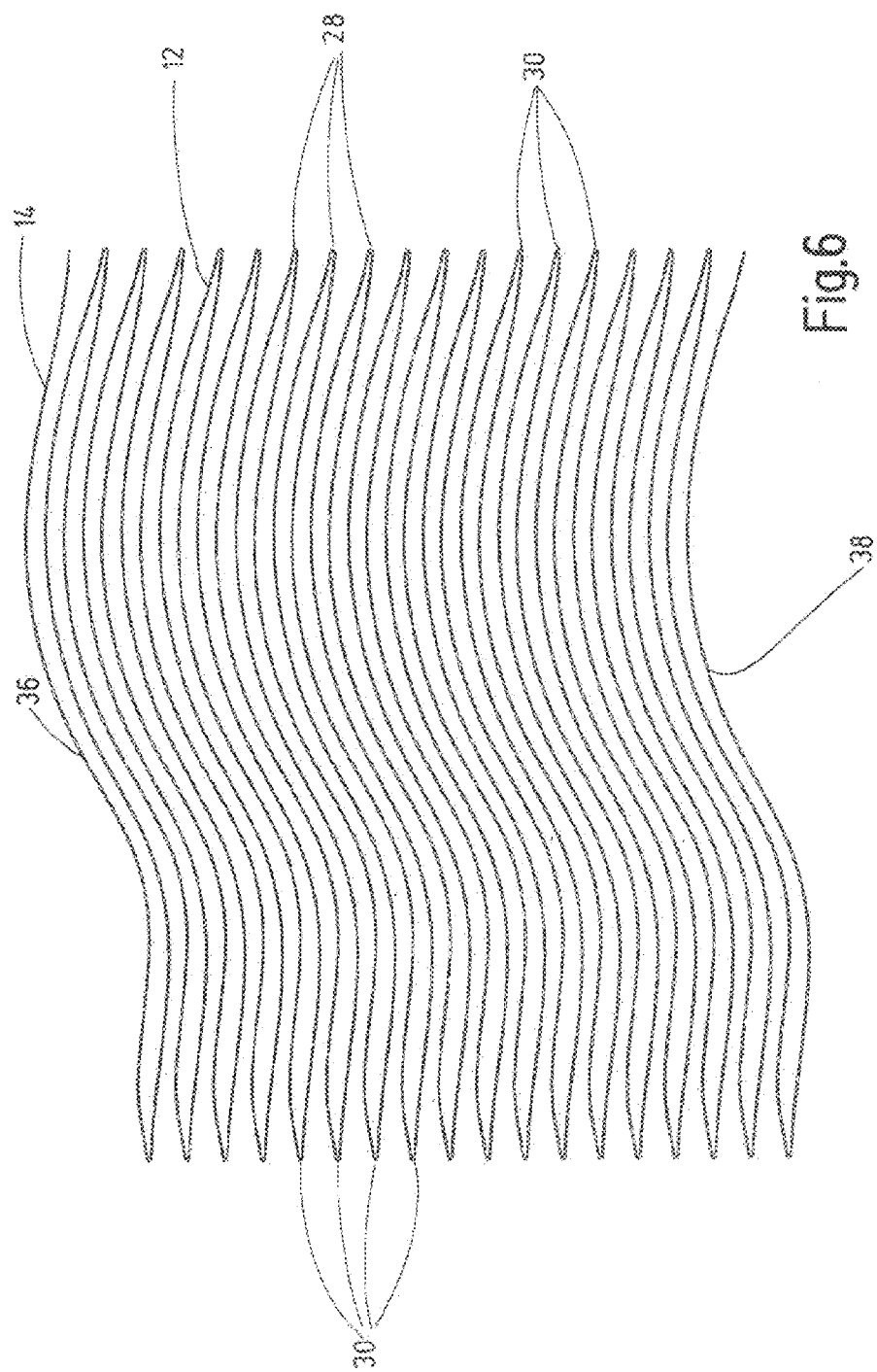

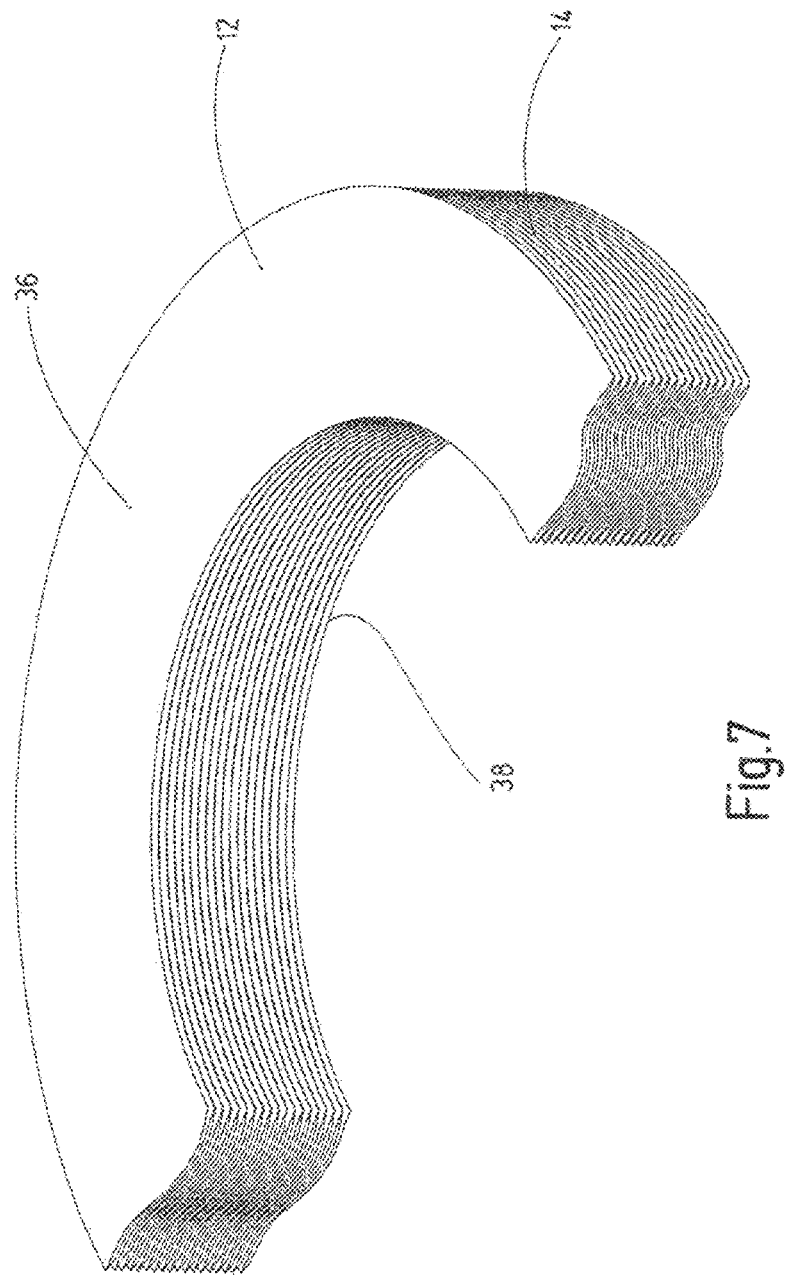

SEPARATOR AND HYDRAULIC ACCUMULATOR HAVING SUCH A SEPARATOR

CROSS-REFERENCE TO RELATED APPLICATIONS

This application claims priority to German Patent Application No. DE 10 2021 002 971.2, filed on Jun. 10, 2021 with the German Patent and Trademark Office. The contents of the aforesaid patent application are incorporated herein for all purposes.

BACKGROUND

This background section is provided for the purpose of generally describing the context of the disclosure. Work of the presently named inventor (s), to the extent the work is described in this background section, as well as aspects of the description that may not otherwise qualify as prior art at the time of filing, are neither expressly nor impliedly admitted as prior art against the present disclosure.

The disclosure relates to a separator, in particular for a bellows accumulator, with one single diaphragm, which, viewed in cross-section, is deflected in an arcuate shape to form a multitude of bellows pleats at deflection points, which delimit the individual bellows pleats on the outside and the inside. The disclosure further relates to a hydraulic accumulator comprising such a separator.

From DE 100 09 865 B4 a hydropneumatic accumulator, in particular a pulsation damper, is known, which is designed as a bellows accumulator and which comprises: an accumulator housing containing a fluid chamber for accommodating a gas charge generating a preload pressure and a further fluid chamber for accommodating a hydraulic medium; a metal bellows separating the two fluid chambers from each other, which bellows is closed at one end by an end plate and which bellows is connected to the accumulator housing at its other end in such a way that its interior forms the further fluid chamber for the hydraulic medium; a channel formed in the wall of the accumulator housing, which opens into the further fluid chamber; and a stop device limiting a motion of the end plate of the metal bellows.

The stop device, having one stop acting on the inside and one acting on the outside of the end plate of the metal bellows, provides a mechanical stroke limiter for both the contraction and the expansion of the separating bellows. As a result, the metal bellows is effectively protected against excessive loads and remains functional even during a long period of use.

To obtain the integral metal bellows, first thin-walled tubes are manufactured as the diaphragm starting material, which tubes can be produced by longitudinal welding using a continuous process. Subsequently, this tubular cylinder is formed into a bellows, in which annular corrugations have to be formed as bellows pleats. Mainly hydraulic forming processes are used. In addition, it is also possible to obtain the corrugated bellows pleats by mechanical roll forming.

However, both manufacturing processes have in common that bellows pleat after bellows pleat is produced individually from a solid material, wherein each bellows pleat is arcuate, in particular semicircular, at its respective deflection point as viewed in cross section. The known bellows manufacturing processes largely prevent any wall thickness reductions that impair the bellows service life, for instance an arcuate shape in the area of the deflection point. A disadvantage, however, is that for every size of separating bellows as a continuous individual diaphragm, a tube of the appropriate size first has to be manufactured, increasing the manufacturing effort. Furthermore, in an initial state of the diaphragm, before the expansion motion, the diaphragm surfaces assigned to the bellows pleats expand in parallel to each other, resulting in the transfer of unfavorable stress into the diaphragm material during operation of the separating bellows when a large number of expansion and contraction processes is performed, such that material failure is likely to occur, at least in the long term, particularly in the area of the deflection points.

SUMMARY

A need exists to provide a separator, for example for use in a hydraulic accumulator, which separator can be manufactured simply and inexpensively and which can also be operated without failure over a long period of use. The need is addressed by the subject matter of the independent claim (s).

Embodiments of the invention are described in the dependent claims, the following description, and the drawings.

BRIEF DESCRIPTION OF THE DRAWINGS

FIG. 3 shows an example section of a pleat arrangement of a separator having a straight pleat line;

FIG. 6 shows a pleat line drawn continued to both sides, as it results from the representation of FIG. 5; and FIG. 7 shows a hollow-cylindrical bellows cut open on one side, as it results from the pleat arrangement according to the illustrations in FIGS. 5 and 6.

DESCRIPTION

Figure 2:
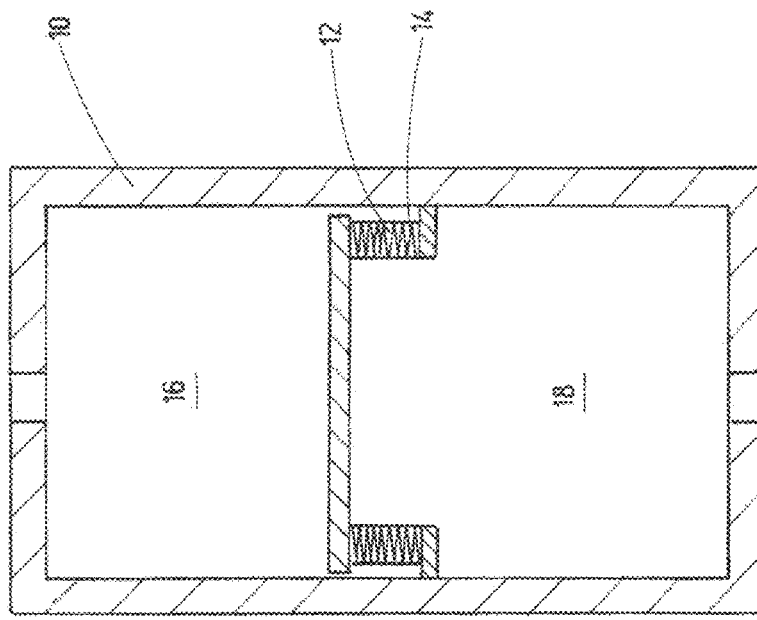
FIGS. 1 and 2 show a highly schematic simplified longitudinal section of an embodiment of a hydraulic accumulator having a movable separator inside the accumulator housing, one as an expanded metal bellows and the other in the contracted state in full contact.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

According to some embodiments, the separator is made from an integral, single diaphragm in conjunction with the individual bellows pleats by means of a 3D printing process or additive manufacturing process. Electron beam melting has proven to be a particularly suitable 3D printing process. In electron beam melting, a metal powder is melted layer by layer and removed as a separator in conjunction with its bellows pleats. Selective laser melting, in which a metal powder is only locally melted, is also suitable. It is also possible to use selective laser sintering, in which a metal powder is briefly heated using a laser to melt the metal, wherein it subsequently solidifies again to form the metallic separator. All of the above 3D printing processes belong, in the broadest sense, to the category sintering and powder printing processes.

In this process, each separator can be obtained individually as a three-dimensional object by applying the diaphragm material layer by layer, wherein series production of larger quantities is also possible. In this way, the separator is obtained in a simple and inexpensive manner, without the need to use hydraulic forming processes or roller-burnishing processes and/or welding processes. Furthermore, the combination of the 3D printing process with the special geometry of the separator, in which the deflection points of the bellows pleats are arcuate when viewed in cross-section and in which the fictitious extensions of the diaphragm surfaces adjacent to each deflection point form an acute angle with each other, at least in an initial state, results in an isotensoid or an essentially isotensoid stress profile achieved in the diaphragm in any operating state of the separator, to prevent material-damaging excessive stresses even in dynamic operation, for instance in the context of a conventional hydraulic accumulator application. The design of the individual bellows pleats with their curved or rounded deflection points thus results in the uniform transfer and distribution of stress across the entire diaphragm, even in dynamic operation.

For a favorable stress curve within the diaphragm-type separator, it has proven beneficial for the respective deflections, which are arcuate when viewed in cross-section, to be at least partially formed from a semicircular arc. For example, provision is further made for the acute angle between two adjacent diaphragm surfaces in the initial state to be ≤30°, or ≤20°.

In some embodiments of the separator, provision is made for the diaphragm material of the diaphragm to be reduced in wall thickness, for example centrally, between two adjacent deflection points located on any common side of the diaphragm. It is surprising to the average expert in this field that despite this wall weakening, a uniform, improved stress input into the diaphragm is achieved, which contributes to its longevity.

In some embodiments of the separator, provision is made for the respective diaphragm surfaces between two adjacent deflection points, which are located on opposite sides of the diaphragm, to have an undulating course. As part of a self-stabilization process, the individual corrugated diaphragm surfaces can engage with each other at least partially flush when placed in full contact increasing the overall stability.

In a beneficial manner, provision is made for a waveform of the diaphragm, in which one diaphragm surface, viewed in stacking sequence, to have a greater inclination relative to the arcuate deflection point than the diaphragm surface adjacent to this deflection point, such that the diaphragm surfaces superordinate in the stacking sequence are always supported accordingly by the flatter diaphragm surface below, improving the expansion and contraction behavior of the bellows as a whole in dynamic operation.

Example materials used for the separator obtained by 3D printing are titanium, stainless steel, or aluminum.

For example, the separator or the diaphragm forms a kind of hollow cylinder in the final printed state, such that the separator can also easily be used quite generally as a compensator device within the framework of a compensating element for fluid-conveying pipelines.

However, it is for example possible to use the bellows-shaped separator in the context of a hydraulic accumulator, in the form of a bellows accumulator, in which the separator used in an accumulator housing separates two media or fluid chambers from each other, wherein the separator is for example designed as described above.

Below, the separator and a hydraulic accumulator are explained in more detail based on various exemplary embodiments in the drawing. The FIGS. are in schematic representation and are not to scale. Specific references to components, process steps, and other elements are not intended to be limiting. Further, it is understood that like parts bear the same or similar reference numerals when referring to alternate FIGS.

Figure 1:
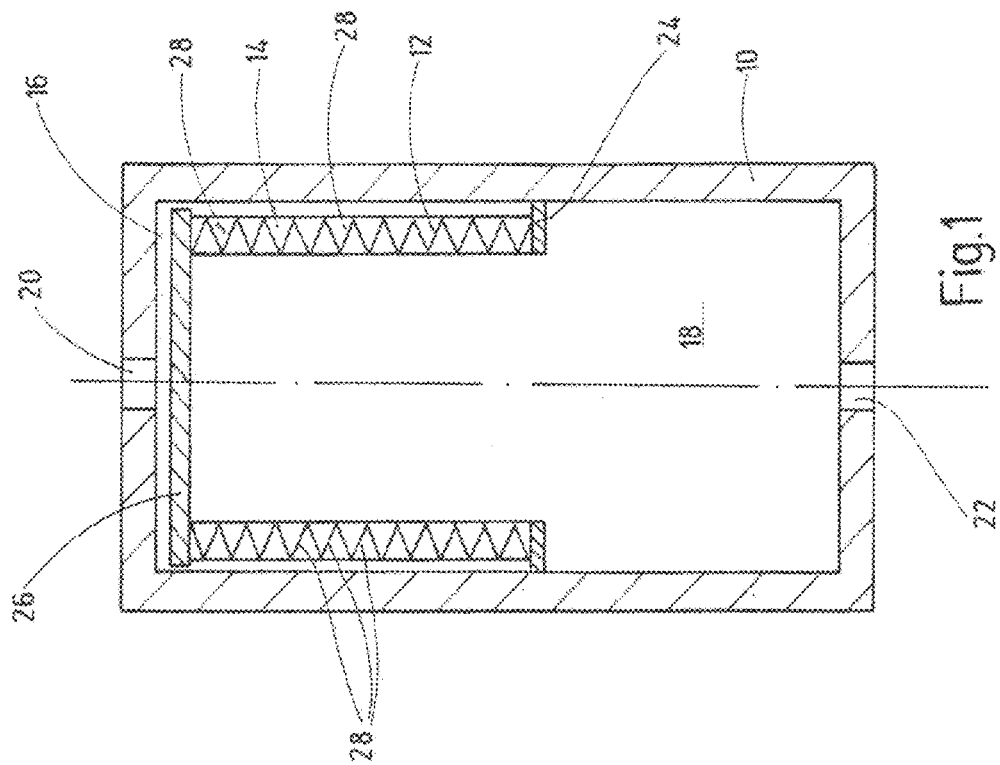

The hydraulic accumulator designed as a bellows accumulator according to FIGS. 1 and 2 comprises, by way of example, a circular-cylindrical accumulator housing 10, wherein a metal bellows 12 is provided in the interior of the accumulator housing 10, which is used as a movable separator 14 that separates a gas end 16 from a fluid end 18 in the interior of the accumulator housing 10. In the usual manner for such hydraulic accumulators, a port 20 leading to the gas end 16 for a process gas, for example nitrogen gas, and a fluid port 22 leading to the fluid or liquid end 18 are provided on the accumulator housing 10.

The metal bellows 12, or the separator 14, is welded at its lower, open end, as viewed in the direction of FIGS. 1 and 2, to a fastening ring 24, which is attached to the inner wall of the accumulator housing 10. The other end of the metal bellows 12 is sealed in a fluid-tight manner by an end plate 26, which is for example welded on. Between the end plate 26 and the mounting ring 24, the metal bellows 12 comprises a plurality of individual successive bellows pleats 28, the configuration of which will be further explained with reference to the FIGS. below.

FIG. 1 shows the hydraulic accumulator in an operating state having a low or no gas pressure on the gas end 16, wherein in that respect the metal bellows 12 is shown in an expanded state such that the free volume of the gas end 16 located on the outside of the bellows is reduced and the volume of the fluid end 18 adjacent to the inside of the metal bellows 12 is increased.

In contrast, FIG. 2 shows an operating state with a low or no fluid pressure on the fluid or liquid end 18, wherein the metal bellows 12 or the separator 14 is fully compressed and wherein the individual bellows pleats 28 are pressed against each other for mutual support, which is technically referred to as "in full contact". In this respect, the metal bellows 12 forms an exceptionally pressure-resistant structure such that the hydraulic accumulator remains operationally safe even at very high gas pressure levels in the event of a drop or complete absence of fluid pressure.

FIG. 3 now shows a possible embodiment of a circular metal bellows 12 having individual superimposed bellows pleats 28, wherein the upper and lower bellows pleats 28 are not shown in their entirety, and it being understood that, depending on the application, a plurality of such bellows pleats 28 disposed one above the other form the separator 14. The individual bellows pleat 28, viewed from the outside and inside, forms individual deflection points 30, which, viewed in cross-section, are arcuate, and in particular at least partially have a semicircular arc in the outer area. Each individual bellows pleat 28 has a wave crest that at a certain distance transitions into a wave trough and then back again to a subsequent wave crest, each formed by the respective semicircular deflection points 30. As can be further seen from FIG. 3, the notional extensions 32 of the diaphragm surfaces 34 adjacent to each deflection point 30, in the fully expanded initial state shown in FIGS. 1 and 3, form an acute angle α with each other, which is ≤30°. If, on the other hand, the metal bellows 12 assumes its full-contact position shown in FIG. 2, the respective adjacent pairs of diaphragm surfaces 34 move towards each other, with a simultaneous increase of the angle α.

The separator shown in FIG. 3 consists of one single, integral diaphragm manufactured using a 3D printing process.

In particular, a powder printing process is used to produce the separation diaphragm. Steel materials such as stainless steel or materials such as titanium or aluminum can be used as metal powders for the 3D printing process. This list of materials is only exemplary and, of course, other suitable metals can also be used in the 3D printing process.

Because the deflection points 30 of the individual bellows pleat 28 are arcuate when viewed in cross-section and because, for the initial state of the metal bellows 12 according to FIG. 3, adjacent diaphragm surfaces 34 form the acute angle α with each other, a separator 14 is obtained overall, which has an isotensoid or essentially isotensoid stress profile across its entire surface, i.e. a uniform transfer and distribution of stress is achieved in the separator 14 across its entire 3D structure, such that stress peaks in the diaphragm material are prevented even in dynamic operation, which benefits long-lasting operation and permits a fast response behavior for the separator 14, even under high dynamic stress. This is without parallel in the prior art.

Figure 4:
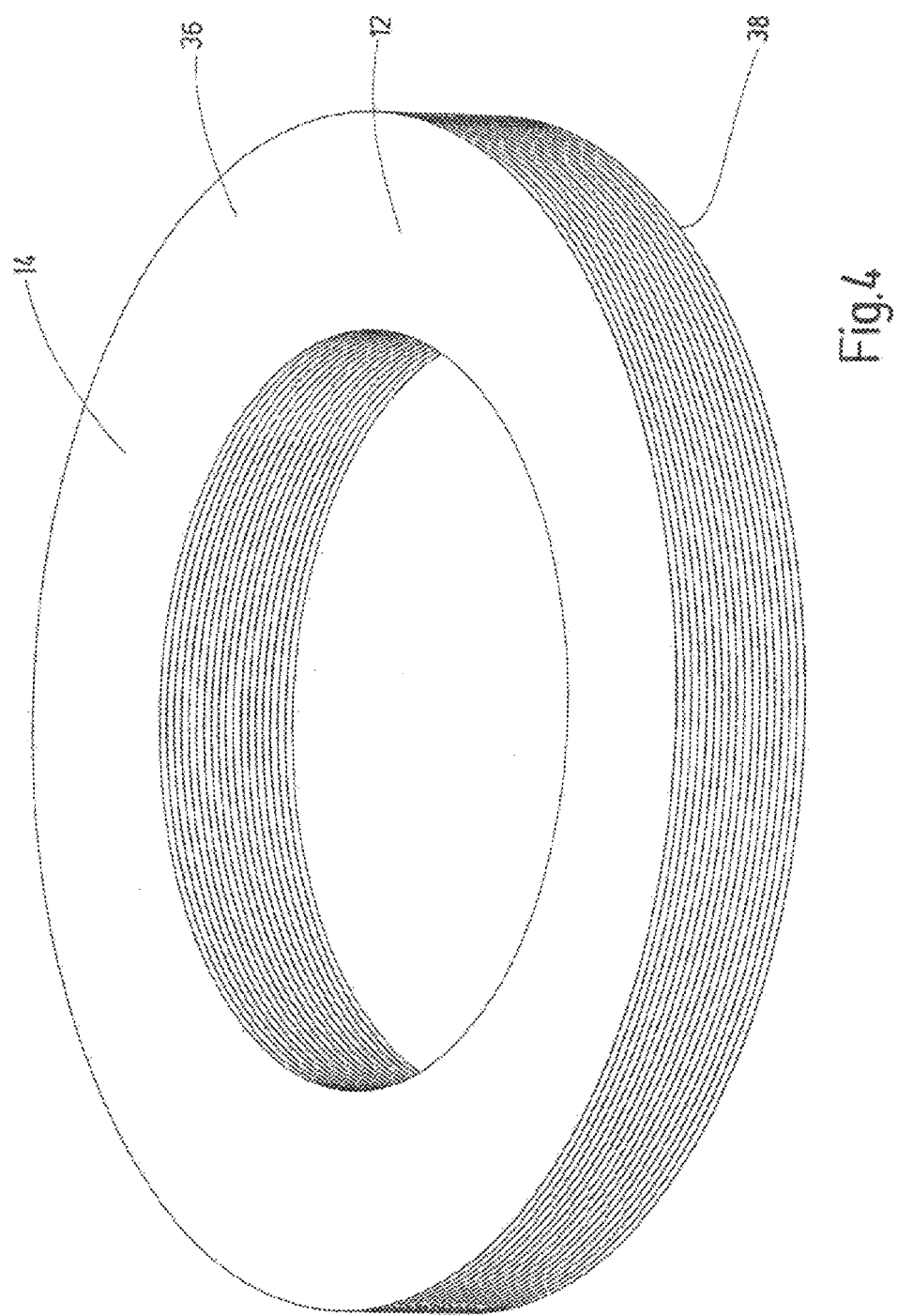
FIG. 4 shows an example hollow-cylindrical metal bellows as it results from the pleat line of FIG. 3.

The metal bellows 12, which is only shown in part in FIG. 3, is shown as a whole in FIG. 4 and forms a separator 14 in full contact as shown in FIG. 2. Here, the top face 36 is connected to the end plate 26 and the top face 38 of the metal bellows 12 is connected to the fastening ring 24 for securing the separator 14 to the inside of the accumulator housing 10 according to the illustrations shown in FIGS. 1 and 2. It goes without saying that within the 3D printing process, it is also possible in principle to form both the end plate 26 and, if applicable, the fastening ring 24 integrally with the metal bellows 12 from corresponding metal materials.

Figure 5:
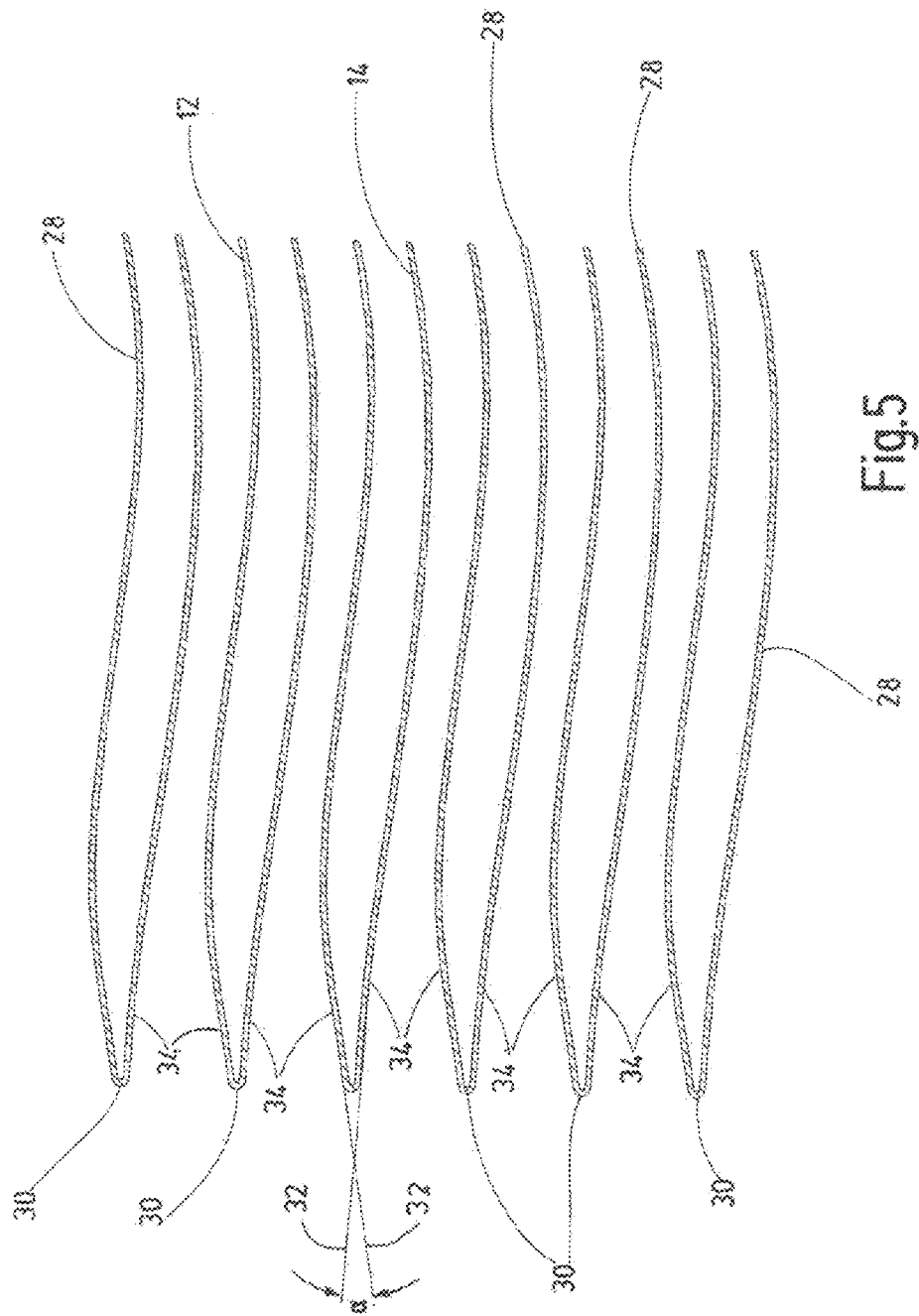
FIG. 5 shows a further embodiment of a bellows-shaped separator having undulating pleats.

FIG. 5 shows a further separator solution modified in comparison with the solution according to FIGS. 3 and 4, wherein the previous explanations also apply to the modified embodiment and in this respect the same reference signs are also used for the same components. FIG. 5 shows a detail of an undulating diaphragm, in which the deflection points 30, again at the ends, are provided with a semicircular arc. Again, the diaphragm surfaces 34 assigned to each other in pairs and their notional extensions 32 at each deflection point 30, form an acute angle α of less than 20° with each other, in particular an angle of 15°. In this way, a kind of wedge is formed in the outer circumferential end area of the separator, as viewed in cross-section, which wedge is particularly effective in absorbing forces when the metal bellows 12 is compressed.

As results from FIG. 5, in the stacking sequence, the diaphragm surface 34 on top has a greater curvature than the diaphragm surface 34 of a subjacent bellows pleat 28, resulting in an increase in the flexural strength values. Furthermore, when each bellows pleat 28 is compressed, the flatter substrate formed by the diaphragm surface 34 provides an improved support effect with a correspondingly high transfer of force. FIG. 5 again concerns the initial state with expanded bellows pleats 28, as shown in FIG. 1. Further, the individual bellows pleats 28 are maintained at substantially constant distances from each other in both the expanded and contracted states.

FIG. 6 reproduces the pleat pattern shown in FIG. 5 for a corrugated separation diaphragm as a whole, having deflection points 30 disposed in an outer wall area and an inner wall area. The illustration according to FIG. 7 represents a half section and shows, similar to the illustration according to FIG. 4, the separator as a hollow cylinder, the top face 36 of which in turn can be connected to the end plate 26 and the underside 38 of which can be connected to the fastening ring 24. As can be seen further in FIGS. 5 and 6, the diaphragm surfaces 34 in their undulating configuration engage, at least partially, with each other using their surfaces, provided the individual bellows pleats 28 are in full contact, according to the representation shown in FIG. 2. This also results in improved bracing against any transverse forces that may occur.

As can also be seen in FIG. 3, it is possible to reduce the wall thickness of the diaphragm material of the diaphragm, for example centrally between two adjacent deflection points 30 of a bellows pleat 28, wherein the area of wall thickness reduction in this respect is designated as 40 in FIG. 3. Such a reduction in wall thickness is basically also possible based on the diaphragm according to FIGS. 5 to 7. It is surprising for an average expert in the field of design of such separators to arrive at an improved bending force behavior, despite the mentioned wall thickness reduction 40.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A hydraulic accumulator, having an accumulator housing and a bellows-shaped separator disposed therein, which separates two media chambers from each other inside the accumulator housing, wherein the separator is produced by a 3D printing process, consisting of one single diaphragm; wherein the diaphragm, when viewed in cross section, is deflected in an arcuate shape to form a multitude of bellows pleats at deflection points, which delimit the bellows pleats on an outside and an inside; wherein to obtain an isotensoid or essentially isotensoid stress profile in the diaphragm, notional extensions of the diaphragm surfaces adjacent to each deflection point form an acute angle (a) with each other at least in an initial state; wherein the individual diaphragm surface between two adjacent deflection points, which are located on opposite sides of the diaphragm, has an undulating course, wherein the diaphragm material of the diaphragm is reduced in wall thickness between two adjacent deflection points located on any common side of the diaphragm.

2. The hydraulic accumulator of claim 1, wherein the respective deflection points, which are arcuate when viewed in cross-section, are at least partially formed from a semicircular arc.

3. The hydraulic accumulator of claim 2, wherein the acute angle ($\alpha$) is $\leq 30°$.

4. The hydraulic accumulator of claim 2, wherein the acute angle ($\alpha$) is $\leq 20°$.

5. The hydraulic accumulator of claim 1, wherein the acute angle ($\alpha$) is $\leq 30°$.

6. The hydraulic accumulator of claim 1, wherein an undulating curve of the individual diaphragm surfaces is configured to be identical in such a way that, when the diaphragm surfaces are placed against each other in full contact, they engage flush with one another.

7. The hydraulic accumulator of claim 1, wherein for a waveform of the diaphragm, in which one diaphragm surface in stacking sequence has a greater inclination relative to the arcuate deflection point than the diaphragm surface adjacent to the deflection point.

8. The hydraulic accumulator of claim 1, wherein the material from which the diaphragm is made is one of:
Titanium,
Stainless steel, or
Aluminum.

9. The hydraulic accumulator of claim 1, wherein the diaphragm forms a hollow cylinder in the final printed state.

10. The hydraulic accumulator of claim 1, wherein the acute angle ($\alpha$) is $\leq 20°$.

11. A separator for a bellows accumulator, which separator movably separates a gas media chamber and a fluid media chamber from each other, consisting of one single diaphragm; wherein the diaphragm, when viewed in cross section, is deflected in an arcuate shape to form a multitude of bellows pleats at deflection points, which delimit the bellows pleats on an outside and an inside; wherein to obtain an isotensoid or essentially isotensoid stress profile in the diaphragm, notional extensions of the diaphragm surfaces adjacent to each deflection point form an acute angle with each other at least in an initial state; wherein
the individual diaphragm surface between two adjacent deflection points, which are located on opposite sides of the diaphragm, has an undulating course, wherein the diaphragm material of the diaphragm is reduced in wall thickness between two adjacent deflection points located on any common side of the diaphragm.

12. A separator for a bellows accumulator with an accumulator housing for receiving the separator therein, the separator consisting of one single diaphragm; wherein
the diaphragm, when viewed in cross section, is deflected in an arcuate shape to form a multitude of bellows pleats at deflection points, which delimit the bellows pleats on an outside and an inside; wherein
to obtain an isotensoid or essentially isotensoid stress profile in the diaphragm, notional extensions of the diaphragm surfaces adjacent to each deflection point form an acute angle ($\alpha$) with each other at least in an initial state; wherein
the acute angle ($\alpha$) is $\leq 30°$; and wherein
the diaphragm material of the diaphragm is reduced in wall thickness between two adjacent deflection points located on any common side of the diaphragm, and the individual diaphragm surface between two adjacent deflection points, which are located on opposite sides of the diaphragm, has an undulating course.

13. The separator of claim 12, wherein the respective deflection points, which are arcuate when viewed in cross-section, are at least partially formed from a semicircular arc.

14. The separator of claim 12, wherein for a waveform of the diaphragm, in which one diaphragm surface in stacking sequence has a greater inclination relative to the arcuate deflection point than the diaphragm surface adjacent to the deflection point.

15. A separator, which is produced by a 3D printing process, consisting of one single diaphragm; wherein
the diaphragm, when viewed in cross section, is deflected in an arcuate shape to form a multitude of bellows pleats at deflection points, which delimit the bellows pleats on an outside and an inside; wherein
to obtain an isotensoid or essentially isotensoid stress profile in the diaphragm, notional extensions of the diaphragm surfaces adjacent to each deflection point form an acute angle ($\alpha$) with each other at least in an initial state; wherein
the diaphragm material of the diaphragm is reduced in wall thickness between two adjacent deflection points located on any common side of the diaphragm; and wherein the individual diaphragm surface between two adjacent deflection points, which are located on opposite sides of the diaphragm, has an undulating course.

16. The separator of claim 15, wherein the acute angle ($\alpha$) is $\leq 30°$.

17. The separator of claim 15, wherein an undulating curve of the individual diaphragm surfaces is configured to be identical in such a way that, when the diaphragm surfaces are placed against each other in full contact, they engage flush with one another.

18. The separator of claim 15, wherein for a waveform of the diaphragm, in which one diaphragm surface in stacking sequence has a greater inclination relative to the arcuate deflection point than the diaphragm surface adjacent to the deflection point.

* * * * *